US009393870B2

(12) United States Patent
Ng-Thow-Hing et al.

(10) Patent No.: US 9,393,870 B2
(45) Date of Patent: Jul. 19, 2016

(54) VOLUMETRIC HEADS-UP DISPLAY WITH DYNAMIC FOCAL PLANE

(71) Applicants: Honda Motor Co., Ltd., Tokyo (JP); Making Virtual Solid—California, LLC, San Jose, CA (US); Chris Grabowski, San Jose, CA (US)

(72) Inventors: Victor Ng-Thow-Hing, Sunnyvale, CA (US); Tom Zamojdo, San Jose, CA (US); Chris Grabowski, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 14/463,618

(22) Filed: Aug. 19, 2014

(65) Prior Publication Data

US 2014/0354692 A1 Dec. 4, 2014

Related U.S. Application Data

(63) Continuation-in-part of application No. 13/832,918, filed on Mar. 15, 2013, now Pat. No. 9,164,281, and a continuation-in-part of application No. 14/460,478, filed on Aug. 15, 2014.

(51) Int. Cl.
*B60K 35/00* (2006.01)
*G02B 27/01* (2006.01)
*G06F 3/01* (2006.01)

(52) U.S. Cl.
CPC ............... *B60K 35/00* (2013.01); *G02B 27/01* (2013.01); *G02B 27/0101* (2013.01);
(Continued)

(58) Field of Classification Search
CPC ........... B60K 35/00; B60K 2350/2052; G02B 27/01; G02B 27/0101; G02B 2027/014; G02B 2027/0127; G02B 2027/0154; G06F 3/013
See application file for complete search history.

(56) References Cited

U.S. PATENT DOCUMENTS 5,051,735 A 9/1991 Furukawa
5,115,398 A 5/1992 De Jong
(Continued)

FOREIGN PATENT DOCUMENTS

DE 10130046 1/2003
DE 10131720 1/2003
(Continued)

OTHER PUBLICATIONS

Office Action of U.S. Appl. No. 14/465,049 dated Nov. 19, 2015, 63 pages.
(Continued)

*Primary Examiner* — Maurice L McDowell, Jr.
(74) *Attorney, Agent, or Firm* — Rankin, Hill & Clark LLP

(57) ABSTRACT

A heads-up display device for displaying graphic elements in view of a user while the user views an environment through a display screen. The heads-up display device includes at least one projector that projects a graphic element on a dynamic, frontal focal plane in view of the user while the user views the environment through the display screen, and at least one projector that projects a graphic element on a static, ground-parallel focal plane in view of the user while the user views the environment through the display screen. A controller determines a target graphic element position and a graphic element size based on the target graphic element position for the graphic element projected on the frontal focal plane, so as to provide the user with an immersive three-dimensional heads-up display.

16 Claims, 6 Drawing Sheets

(52) U.S. Cl.
CPC ........ *G06F 3/013* (2013.01); *B60K 2350/2052* (2013.01); *G02B 2027/014* (2013.01); *G02B 2027/0127* (2013.01); *G02B 2027/0154* (2013.01)

(56) References Cited

U.S. PATENT DOCUMENTS

| | | | |
|---|---|---|---|
| 5,368,309 | A | 11/1994 | Monroe et al. |
| 5,440,428 | A | 8/1995 | Hegg et al. |
| 5,519,536 | A | 5/1996 | Hoehn |
| 6,222,583 | B1 | 4/2001 | Matsumura et al. |
| 6,285,317 | B1 | 9/2001 | Ong |
| 6,574,555 | B2 | 6/2003 | Mochizuki et al. |
| 6,708,087 | B2 | 3/2004 | Matsumoto |
| 6,735,517 | B2 | 5/2004 | Engelsberg et al. |
| 6,774,772 | B2 | 8/2004 | Hahn |
| 6,947,064 | B1 | 9/2005 | Hahn et al. |
| 7,124,027 | B1 | 10/2006 | Ernst |
| 7,190,260 | B2 | 3/2007 | Rast |
| 7,216,035 | B2 | 5/2007 | Hortner et al. |
| 7,379,813 | B2 | 5/2008 | Kubota |
| 7,519,471 | B2 | 4/2009 | Shibata et al. |
| 7,565,230 | B2 | 7/2009 | Gardner et al. |
| 7,627,419 | B2 | 12/2009 | Yoshida |
| 7,647,170 | B2 | 1/2010 | Sawaki et al. |
| 7,783,422 | B2 | 8/2010 | Tanaka |
| 7,815,313 | B2 | 10/2010 | Ito et al. |
| 7,920,102 | B2 | 4/2011 | Breed |
| 8,135,536 | B2 | 3/2012 | Matsunaga et al. |
| 8,208,208 | B2 | 6/2012 | Schwab |
| 8,305,444 | B2 | 11/2012 | Hada |
| 8,352,181 | B2 | 1/2013 | Hagiwara |
| 8,358,224 | B2 | 1/2013 | Seder et al. |
| 8,406,990 | B2 | 3/2013 | Barkowski et al. |
| 8,411,245 | B2 | 4/2013 | Lee et al. |
| 8,620,575 | B2 | 12/2013 | Vogt et al. |
| 8,633,810 | B2 | 1/2014 | Luo et al. |
| 8,633,979 | B2 | 1/2014 | Szczerba et al. |
| 8,660,735 | B2 | 2/2014 | Tengler et al. |
| 8,686,872 | B2 | 4/2014 | Szczerba et al. |
| 8,686,922 | B2 | 4/2014 | Breed |
| 8,725,342 | B2 | 5/2014 | Ferguson et al. |
| 2004/0193347 | A1 | 9/2004 | Harumoto et al. |
| 2005/0004723 | A1 | 1/2005 | Duggan et al. |
| 2005/0071082 | A1 | 3/2005 | Ohmura et al. |
| 2005/0195383 | A1 | 9/2005 | Breed et al. |
| 2006/0262140 | A1 | 11/2006 | Kujawa et al. |
| 2007/0087756 | A1 | 4/2007 | Hoffberg |
| 2007/0185644 | A1 | 8/2007 | Hirose |
| 2008/0046150 | A1 | 2/2008 | Breed |
| 2008/0318676 | A1 | 12/2008 | Ham |
| 2009/0005961 | A1 | 1/2009 | Grabowski et al. |
| 2009/0210257 | A1 | 8/2009 | Chalfant et al. |
| 2009/0268946 | A1 | 10/2009 | Zhange et al. |
| 2010/0192110 | A1 | 7/2010 | Carter et al. |
| 2010/0201894 | A1 | 8/2010 | Nakayama et al. |
| 2010/0253492 | A1 | 10/2010 | Seder et al. |
| 2010/0253493 | A1 | 10/2010 | Seder et al. |
| 2010/0253601 | A1 | 10/2010 | Seder et al. |
| 2010/0274480 | A1 | 10/2010 | McCall et al. |
| 2010/0292886 | A1 | 11/2010 | Szczerba et al. |
| 2010/0332266 | A1 | 12/2010 | Tamir et al. |
| 2011/0018903 | A1 | 1/2011 | Lapstun et al. |
| 2011/0022393 | A1 | 1/2011 | Wäller et al. |
| 2011/0052042 | A1 | 3/2011 | Ben Tzvi |
| 2011/0075257 | A1 | 3/2011 | Hua et al. |
| 2011/0093190 | A1 | 4/2011 | Yoon |
| 2011/0106428 | A1 | 5/2011 | Park et al. |
| 2011/0199376 | A1 | 8/2011 | Saleman |
| 2011/0251768 | A1 | 10/2011 | Luo et al. |
| 2012/0019557 | A1 | 1/2012 | Aronsson et al. |
| 2012/0041632 | A1 | 2/2012 | Bordes |
| 2012/0072105 | A1 | 3/2012 | Feyereisen et al. |
| 2012/0083964 | A1 | 4/2012 | Montemerlo et al. |
| 2012/0154441 | A1 | 6/2012 | Kim |
| 2012/0162255 | A1 | 6/2012 | Ganapathy et al. |
| 2012/0173069 | A1 | 7/2012 | Tsimhoni et al. |
| 2012/0212405 | A1 | 8/2012 | Newhouse et al. |
| 2012/0224060 | A1 | 9/2012 | Gurevich et al. |
| 2012/0249589 | A1 | 10/2012 | Gassner et al. |
| 2012/0283942 | A1 | 11/2012 | T'Siobbel et al. |
| 2012/0310531 | A1 | 12/2012 | Agarwal et al. |
| 2013/0050258 | A1 | 2/2013 | Liu et al. |
| 2013/0083291 | A1 | 4/2013 | Smithwick et al. |
| 2013/0151145 | A1 | 6/2013 | Ishikawa |
| 2013/0261871 | A1 | 10/2013 | Hobbs et al. |
| 2013/0262997 | A1 | 10/2013 | Markworth et al. |
| 2014/0005857 | A1 | 1/2014 | Heisterkamp |
| 2014/0019913 | A1 | 1/2014 | Newman et al. |
| 2014/0036374 | A1 | 2/2014 | Lescure et al. |
| 2014/0063064 | A1 | 3/2014 | Seo et al. |
| 2014/0114845 | A1 | 4/2014 | Rogers et al. |
| 2014/0139524 | A1 | 5/2014 | Nilsson et al. |
| 2014/0267263 | A1 | 9/2014 | Beckwith et al. |
| 2014/0267398 | A1 | 9/2014 | Beckwith et al. |

FOREIGN PATENT DOCUMENTS

| | | |
|---|---|---|
| DE | 102006008981 | 8/2007 |
| DE | 102012210145 | 7/2009 |
| DE | 102008040467 | 1/2010 |
| DE | 102008042734 | 4/2010 |
| DE | 102009045169 | 3/2011 |
| DE | 102012221762 | 6/2013 |
| EP | 1862988 | 11/2009 |
| EP | 2618108 | 7/2013 |
| JP | 2006309552 | 11/2006 |
| WO | 2010040589 | 4/2010 |
| WO | 2011108091 | 9/2011 |

OTHER PUBLICATIONS

Office Action of U.S. Appl. No. 13/832,918 issued May 8, 2015.
Website: "BMW Technology Guide: Adaptive Brake Assistant" http://www.bmw.com/com/en/insights/technology/technology_guide/articles/adaptive_brake_assistant.html, printed Oct. 17, 2014.
Website: "Adaptive Cruise Control and Collision Warning with Brake Support" http://corporate.ford.com/doc/Adaptive_Cruise.pdf, Jul. 2012.
Article: Alves, P.R. et al. "Forward Collision Warning Systems Using Heads-up Displays: Testing Usability of Two New Metaphors", Intelligent Vehicles Symposium (IV), 2013 IEEE, pp. 1-6, http://ueeexplore/ieee.org/xpl/login.jsp?tp=&arnumber=6629438&url=htp%3A%2F%2ieeexplore.ieee.org%2Fstamp%2Fstamp.jsp%3Ftp%3D%26arnumber%3D6629438.
Article: Ho, C. et al. "Multisensory In-Car Warning Signals for Collision Avoidance" Human Factors: The Journal of the Human Factors and Ergonomics Society, 49(6), 1107-1114, Dec. 2007, http://www.ncbi.nlm.nih.gov/pubmed/18074709.
Article: Gray R. et al. "A Comparison of Different Informative Vibrotactile Forward Collision Warnings: Does the Warning Need to Be Linked to the Collision Event?", PloS One, 9(1), e87070, Jan. 27, 2014, http://www.plosone.org/article/info%3Adoi%2F10.1371%2Fjournal.pone.0087070.
Article: Tai et al. "Bridging the Communication Gap: A Driver-Passenger Video Link" dated Apr. 15, 2010, https://www.pervasive.wiwi.uni-due.de/uploads/tx_itochairt3/publications/Bridging_the_Communication_Gap-MC2009-GraceTai_01.pdf.
Website: "Future Car Technologies" dated Dec. 19, 2013, http://www.carcoversdirect.com/car-lovers-resources/fact-friday/future-car-technologies/#.U3uVbPldVJ1.
Office Action of U.S. Appl. No. 14/041,614 dated Dec. 23, 2014.
Autoblog, GM's Full-Windshield HUD Technology | Autoblog, YouTube, Mar. 17, 2010, http://www.youtube.com/watch?v=wR5EAGM4-U&feature=youtu.be&t=1m15s.
MVS California, 2_Working_Demo.mov, YouTube, May 16, 2011, http://www.youtube.com/watch?v=pdtcyaF6bTI.
Office Action of U.S. Appl. No. 13/832,918 dated Jan. 2, 2015.
Office Action of U.S. Appl. No. 14/041,614 dated May 6, 2015.

(56) References Cited

OTHER PUBLICATIONS

Office Action of U.S. Appl. No. 13/832,209 dated Jul. 16, 2015, 37 pages.
Search Report of DE Application No. 102014219575.6 dated Dec. 16, 2015, 12 pages.
Examination Report of DE Application No. 102014219575.6 dated Dec. 17, 2015, 10 pages.
Office Action of U.S. Appl. No. 14/041,614 dated Aug. 6, 2015, 21 pages.
Office Action of U.S. Appl. No. 14/321,105 dated Sep. 24, 2015, 37 pages.
Office Action of U.S. Appl. No. 13/832,209 dated Jan. 30, 2015, 26 pages.
Office Action of U.S. Appl. No. 14/041,614 dated Feb. 3, 2016, 45 pages.
Office Action of U.S. Appl. No. 14/460,478 dated Feb. 8, 2016, 70 pages.
Office Action of U.S. Appl. No. 14/465,049 dated Feb. 24, 2016, 31 pages.
Office Action of U.S. Appl. No. 14/321,105 dated Apr. 20, 2016, 37 pages.
Office Action of U.S. Appl. No. 14/460,478 dated Apr. 25, 2016, 18 pages.

VOLUMETRIC HEADS-UP DISPLAY WITH DYNAMIC FOCAL PLANE

CROSS-REFERENCE TO RELATED APPLICATIONS

The instant application is a continuation-in-part of, and claims priority to, U.S. application Ser. No. 13/832,918, filed on Mar. 15, 2013, and U.S. application Ser. No. 14/460,478, filed on Aug. 15, 2014 (and claiming priority to the '918 application). The content of U.S. application Ser. No. 13/832,918 is hereby incorporated in full by reference.

BACKGROUND

To improve driver convenience, a vehicle may be a provided with a heads-up display (HUD) which displays information to the driver. The information displayed by the HUD may be projected onto the windshield of the vehicle so as to present the information in the driver's view while the driver is driving. By displaying the information in the driver's view, the driver does not need to look away from the windshield (e.g., toward an instrument display on a center dashboard) while driving to see the presented information.

The HUD may present vehicle information typically displayed in the vehicle's center dashboard, such as information related to the vehicle's speed, fuel level, engine temperature, etc. Additionally, the HUD may also present map information and communication events (e.g., navigation instructions, warnings and alerts, etc.) to the driver. The vehicle HUD may present the information to the driver in a manner similar to that employed by the vehicle dashboard, such as by displaying gauges and text boxes which appear as graphic elements on the windshield. Additionally, the vehicle HUD may present augmented reality graphic elements which augment a physical environment surrounding the vehicle with real-time information.

However, existing HUD devices used in vehicles may not be capable of presenting augmented reality graphic elements with consistent depth cues. A similar shortcoming may also be provided by HUD devices provided in stationary bases. Accordingly, augmented reality graphic elements presented by existing (vehicle) HUDs may be presented as superficial overlays.

BRIEF DESCRIPTION

According to one aspect, a heads-up display system for displaying a graphic element in view of a user while the user views an environment disposed at a position spaced from the heads-up display system is provided. The heads-up display system includes a projector system and a controller. The projector system includes a first projector that projects a first graphic element on a dynamic first focal plane in view of the user while the user views the environment, with the first focal plane disposed in the environment. The controller is programmed to determine a first target graphic element position at which the first graphic element is to be displayed, with the first target graphic element position being disposed in the environment. The controller is also programmed to control the first projector to project the first graphic element on the first focal plane disposed at the first target graphic element position.

According to another aspect, a controller for controlling a heads-up display device that displays graphic elements in view of a user while the user views an environment disposed at a position spaced from and in front of the heads-up display device is provided. The heads-up display device includes a projector system adapted to project a plurality of graphic elements on a plurality of focal planes in view of the user while the user views the environment, with each of the plurality of focal planes being disposed in the environment. The controller is programmed to determine a target graphic element position for each graphic element, and to control the heads-up display device to project each of the plurality of graphic elements on an associated one of the plurality of focal planes disposed at the target graphic element position determined for the graphic element.

According to yet another aspect, a method for displaying a three-dimensional volumetric heads-up display in view of a user in an environment disposed at a position spaced from the user is provided. The method includes determining a target graphic element position of a focal plane on which a graphic element is to be displayed, with the focal plane oriented substantially perpendicularly to a line-of-sight of the user and disposed in the environment in view of the user. The method also includes projecting the graphic element on the focal plane disposed at the target graphic element position.

DETAILED DESCRIPTION

Graphic elements visually placed on environmental elements in the direct view of a user by a HUD device are called contact-analog or conformal augmented reality graphic elements. Successfully presenting contact-analog augmented reality graphic elements to the user of the HUD device depends on the ability of the HUD device to correctly reproduce depth cues. The depth cues include accommodation and vergence. Accommodation is a depth cue where the muscles in the eye actively change the optical power to change focus at different distances. Vergence is the simultaneous inward rotation of the eyes towards each other to maintain a single binocular image when viewing an object.

When a HUD device displays a graphic element on a display screen (e.g., a windshield of a vehicle when the HUD device is provided in a vehicle), accommodation may cause the human eye to shift between environmental elements and information displayed by the HUD device. Vergence may cause the eyes to converge to points beyond the display screen (windshield) into the environment, which may lead to the appearance of a double image of the HUD graphic element displayed on the display screen (windshield). Accordingly, to render contact-analog augmented reality graphic elements with correctly reproduced depth cues, the graphic elements should be rendered into the same space as the real environment, rather than on the display screen (windshield of the vehicle).

Figure 1:
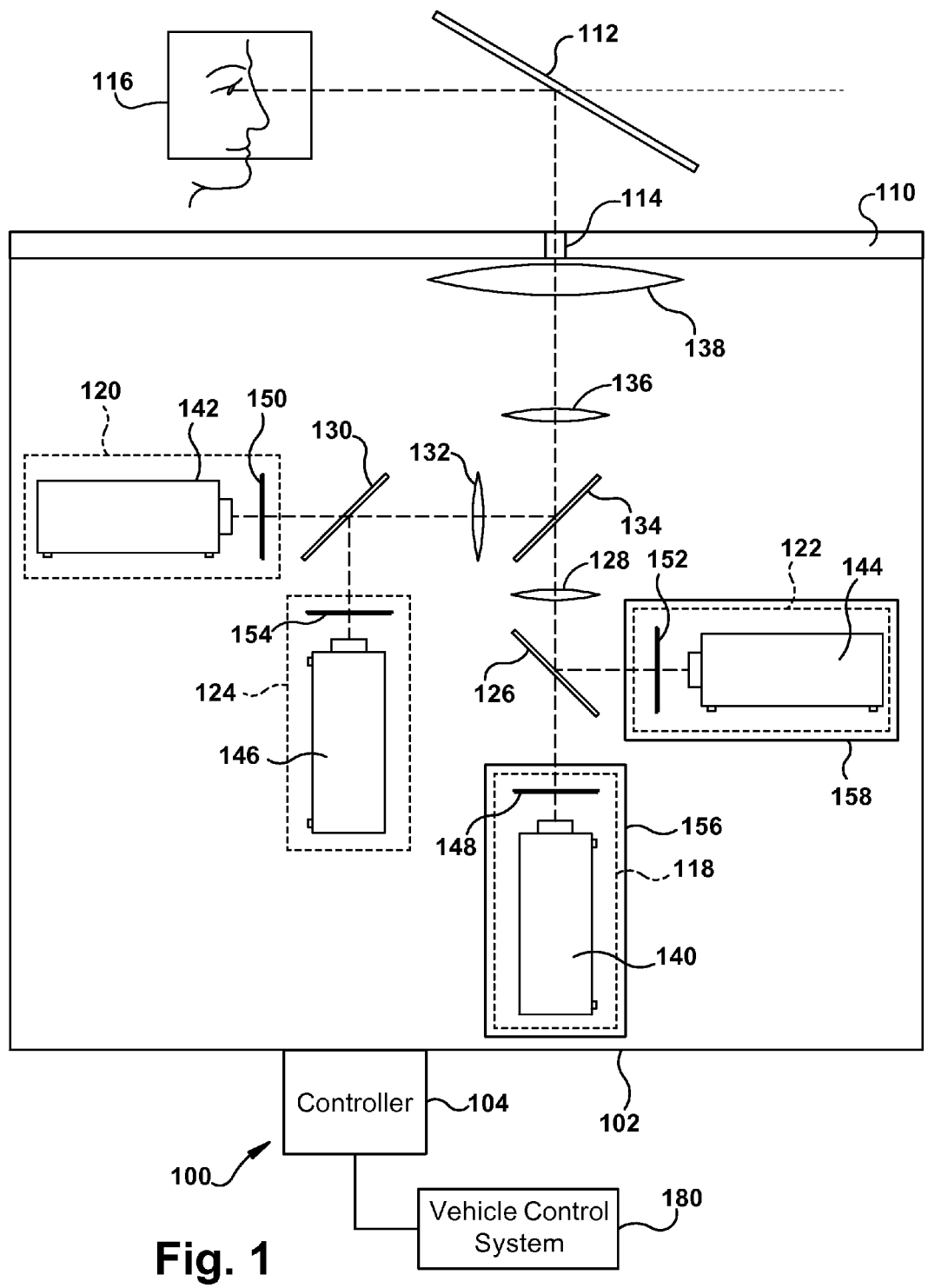
FIG. 1 is a block schematic showing a heads-up display system.
Figure 2:
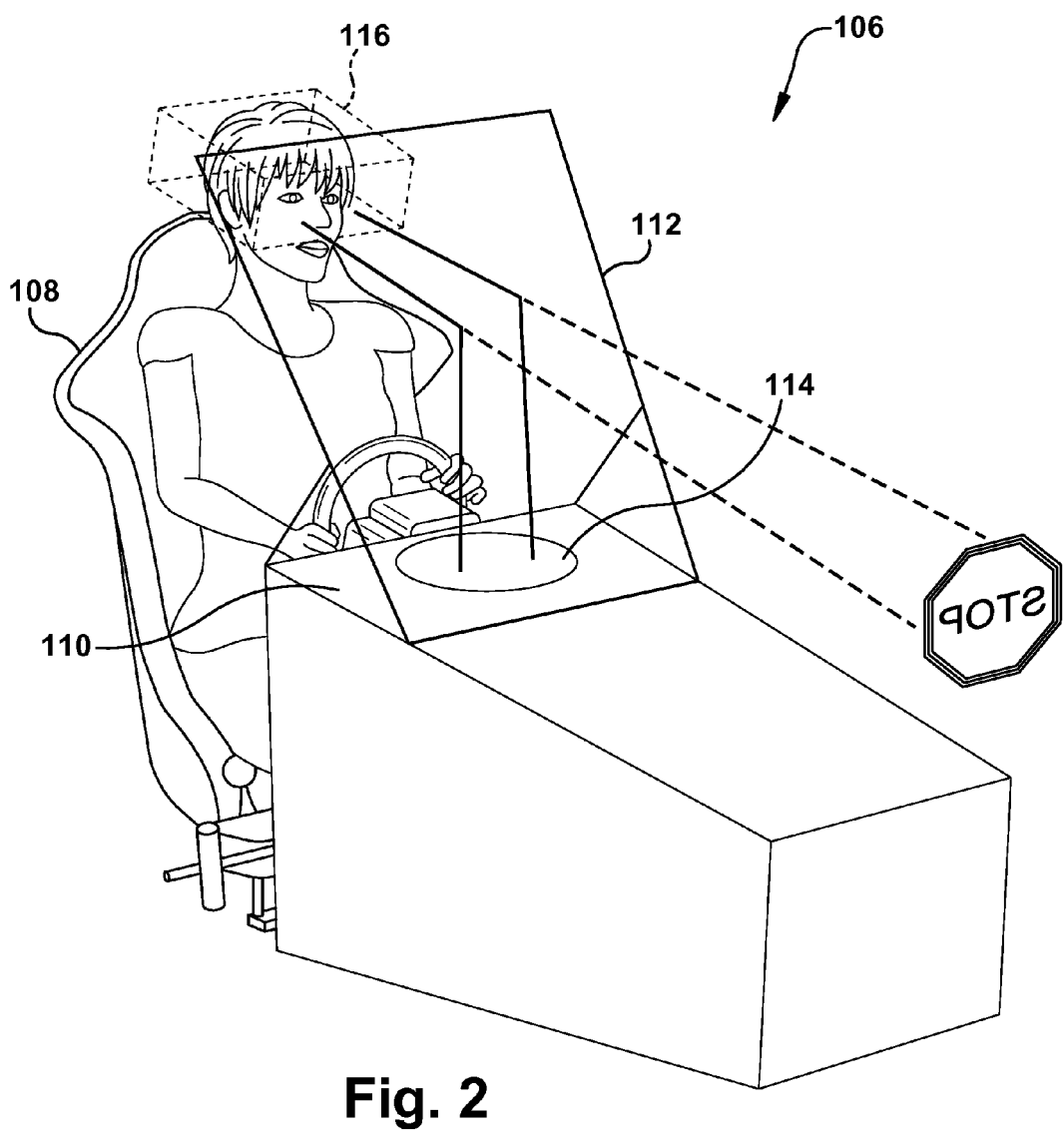
FIG. 2 is a schematic illustration of a vehicle or stationary base in which the heads-up display system is provided.

Referring to FIG. 1, a volumetric heads-up display system 100 ("HUD system 100") capable of rendering volumetric contact-analog augmented reality graphic elements (i.e., 3-dimensional graphic elements rendered into the same space as the real environment) with correctly reproduced depth cues is shown. The HUD system 100 includes a heads-up display device 102 ("HUD device 102") and a controller 104. Referring to FIG. 2, the HUD system 100 may be provided in a vehicle 106, which includes a driver seat 108, a dashboard enclosure 110, and a windshield 112. While the HUD system 100 is described below as being a vehicular HUD system 100, wherein the user is a driver and the display screen is the windshield 112, it is to be appreciated that the HUD system 100 may be provided on a stationary base (e.g., within a room, etc.). In such a configuration, FIG. 2 may be considered to show the stationary base of the HUD system 100, wherein 106 references a seat (rather than a driver seat) and element 112 references a display screen (rather than a windshield).

The configuration of the vehicle 106, particularly with respect to the relative positioning of the driver seat 108, dashboard enclosure 110, and windshield 112, may be conventional. To accommodate the herein-described HUD system 100, the dashboard enclosure 110 defines a housing space in which the HUD system 100 is housed. Furthermore, the dashboard enclosure 110 has a HUD exit aperture 114 defined through an upper surface thereof. The HUD system 100 housed in the dashboard enclosure 110 projects graphic elements, such as contact-analog augmented reality graphic elements, through the HUD exit aperture 114 to the windshield 112, which may be used as a display screen for the HUD system 100. As described in further detail below, the augmented reality graphic elements are rendered to the driver as if in the same space as the real environment.

A driver of the vehicle 106 drives the vehicle 106 while seated in the driver seat 108. Accordingly, the driver may be positionally constrained to a seating position on the driver seat 108 within the vehicle 106. In view of this positional constraint, the HUD system 100 may be designed using an assumption that the driver's view originates from an eye box 116 within the vehicle. The eye box 116 may be considered to include a region of an interior of the vehicle 106 where the driver's eyes are situated while the driver is seated in the driver seat 108.

The eye box 116 may be sized to encompass all possible head positions of the driver regardless of a position and posture of the driver seat 108, or the HUD system 100 may be configured to detect the position and posture of the driver seat 108, and to adjust a position and size of the eye box 116 based thereon. As a further alternative, the HUD system 100 may be designed assuming the eye box 116 has a fixed size and is in a fixed position. For example, the eye box may have the following dimensions: 20 cm×10 cm×10 cm. In any event, the HUD system 100 is configured to present the contact-analog augmented reality graphic elements to the driver when the driver's eyes are within the eye box 116 and the driver is facing/looking in a forward direction through the windshield 112 of the vehicle 106.

The HUD device 102 displays graphic elements in view of the driver of the vehicle 106 while the driver views an environment through the windshield 112 of the vehicle 106. Any graphic or environmental elements viewed by the driver through the windshield 112 while the driver's eyes are in the eye box 116 and the driver is facing/looking in the forward direction through the windshield 112 may be considered to be in view of the driver. As used herein, the view of the driver of the vehicle 106 while the driver views an environment through the windshield 112 of the vehicle 106 is intended to include an area viewed through the windshield 112, excluding dashboard displays located within the vehicle 106. In other words, the HUD device 102 presents the graphic elements such that the driver may view the graphic elements without looking away from the road.

Returning to FIG. 1, the HUD device 102 of the HUD system 100 includes a first projector 118, a second projector 120, a third projector 122, and a fourth projector 124. The first projector 118 and the third projector 122 share a first beam splitter 126 and a first objective lens 128, while the second projector 120 and fourth projector 124 share a second beam splitter 130 and a second objective lens 132. Consequently, the output of the first projector 118 and the third projector 122 is received in the first beam splitter 126 and combined into a singular output, which is directed to (and through) the first objective lens 128. Similarly, the output of the second projector 120 and the fourth projector 124 is received in the second beam splitter 130 and combined into a singular output, which is directed to (and through) the second objective lens 132.

The HUD device 102 further includes a third beam splitter 134 disposed downstream from the first and second objective lenses 128, 132 so as to receive the output from the first and second objective lenses 128, 132. The outputs from the first and second objective lenses 128, 132 are combined at the third beam splitter 134 into a singular output, which is a combination of the output of all of the first, second, third, and fourth projectors 118, 120, 122, 124, and directed to (and through) a third objective lens 136 and an ocular lens 138 before being directed out of the HUD exit aperture 114 to the windshield 112, which is used as the display screen for the HUD system 100.

Each of the first projector 118, the second projector 120, the third projector 122, and the fourth projector 124 include a projector unit 140, 142, 144, 146 and a diffuser screen 148, 150, 152, 154 rigidly fixed a set distance from the projector unit 140, 142, 144, 146 and arranged relative to the projector unit 140, 142, 144, 146 such that light emitted from the projector unit 140, 142, 144, 146 passes through the diffuser screen 148, 150, 152, 154. The projector units 140, 142, 144, 146 are each light-emitting units which project an image or graphic element that passes through the associated diffuser screen 148, 150, 152, 154. The diffuser screens 148, 150, 152, 154 serve luminous image source (or object) for the rest of the optical system of the HUD device 102, and ensure that much of the light leaving the diffuser screens 148, 150, 152, 154 falls into the optics following the diffuser screens 148, 150, 152, 154 (i.e., the first beam splitter 126, the first objective lens 128, the second beam splitter 130, the second objective lens 132, the third beam splitter 134, the third objective lens 136, and the ocular lens 138), while spreading out light so that it eventually fills out the eye-box 116 so that brightness of the image or graphic element(s) stays constant while the driver's head moves within the eye box 116. Accordingly, use of the diffuser screens 148, 150, 152, 154 substantially prevents different parts of the image or graphic element(s) from being visible from different points within the eye box 116, and thereby substantially prevents the occurrence of different visual behavior with slight head movement.

The projector units 140, 142, 144, 146 may take the form of any light-emitting unit suitable for the herein-described use. Particularly, the projector units 140, 142, 144, 146 may take the form of any light-emitting unit capable of projecting an image or graphic element according to the herein-described use(s). Similarly, the diffuser screens 148, 150, 152, 154 may take the form of any light diffusing screen suitable for the herein-described use(s).

The first projector 118 is mounted on a first actuator 156 in the HUD device 102. The first actuator 156 is a linear actuator capable of moving the first projector 118 in a linear direction toward and away from the first beam splitter 126. Additionally, the third projector 122 is mounted on a second actuator 158 in the HUD device 102. The second actuator 158 is a linear actuator capable of moving the third projector 122 in a linear direction toward and away from the first beam splitter 126. The first and second actuators 156, 158 may take the form of any linear actuators suitable for the herein-described use. The ability of the first projector 118 and the third projector 122 to linearly move allows the first projector 118 and the third projector 122 to project graphic elements on dynamic or movable focal planes. In contrast to the first and third projectors 118, 122, the second and fourth projectors 120, 124 are fixedly arranged in the HUD device 102, and therefore project graphic elements on static focal planes.

Using the first, second, third, and fourth projectors 118, 120, 122, 124, the HUD device 102 may render graphic elements (contact-analog augmented reality graphic elements or otherwise) in four distinct focal planes in the environment viewed by the driver through the windshield 112. In this regard, the first projector 118 is configured to project a first graphic element 160 in a first focal plane 162, the second projector 120 is configured to project a second graphic 164 element in a second focal plane 166, the third projector 122 is configured to project a third graphic element 168 in a third focal plane 170, and the fourth projector 124 is configured to project a fourth graphic element 172 in a fourth focal plane 174 (see FIGS. 3 and 4). All of the first, second, third, and fourth graphic elements 160, 164, 168, 172, and their associated first, second, third, and fourth focal planes 162, 166, 170, 174, are rendered in the environment in view of the driver when the driver is driving the vehicle 106 and the driver's eyes are in the eye box 116 while the driver is looking in the forward direction through the windshield 112.

Figure 3:
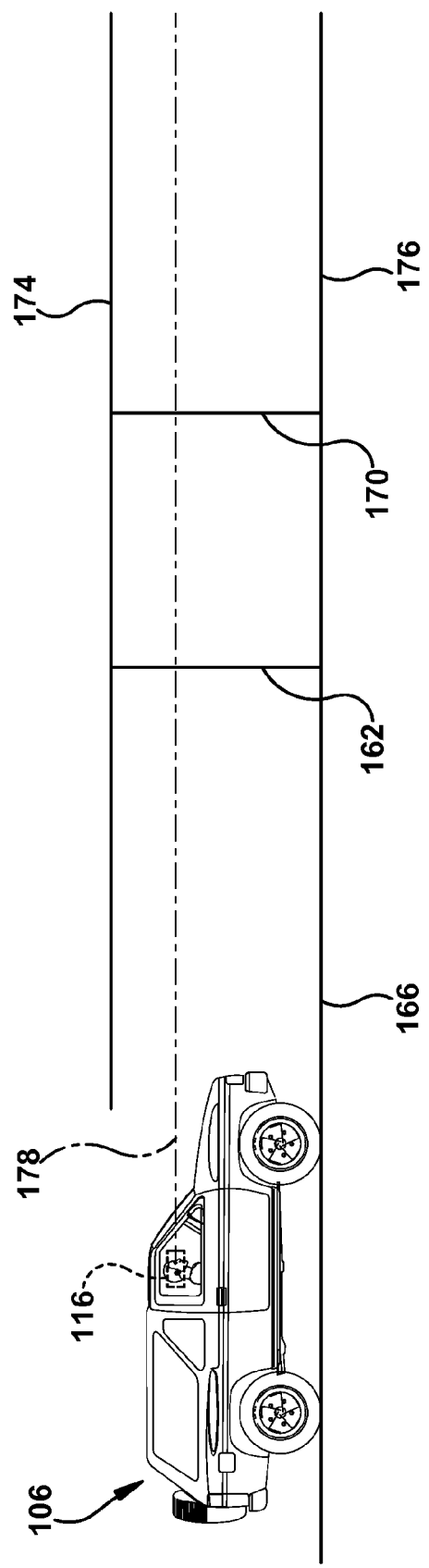
FIG. 3 is a side view of the vehicle which illustrates the four focal planes on which graphic elements are projected by the heads-up display system.
Figure 4:
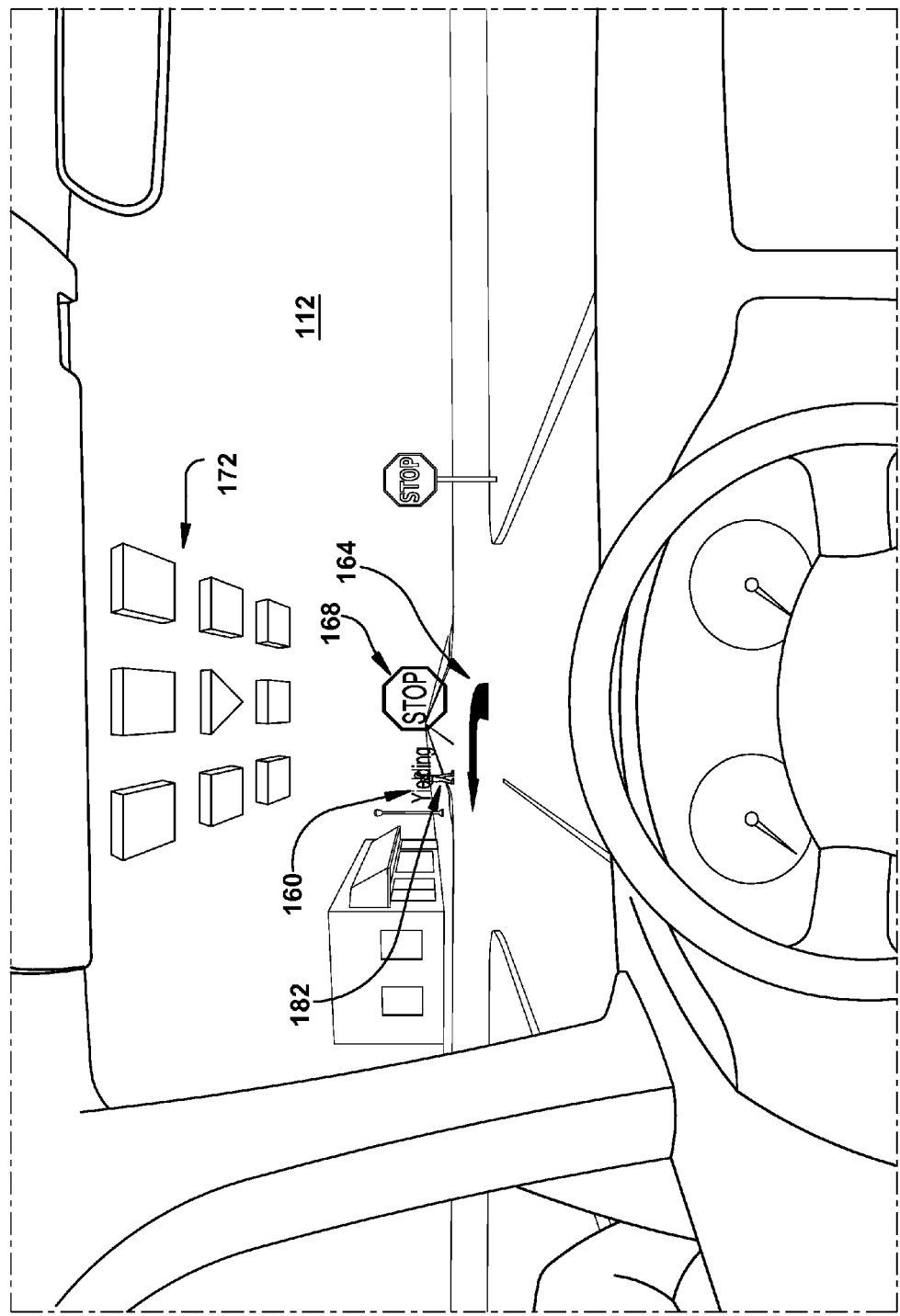
FIG. 4 illustrates an exemplary view of the user as a driver while driving a vehicle and looking through a windshield of the vehicle, and shows exemplary graphic elements projected by the heads-up display system.

Referring to FIGS. 3 and 4, the projection of the first, second, third, and fourth graphic elements 160, 164, 168, 172 on the first, second, third, and fourth focal planes 162, 166, 170, 174 will be described with reference to a ground surface 176 and a line-of-sight 178 of the driver. In this regard, the ground surface 176 is a surface of a road in front of the vehicle 106. For the purposes of the instant description, the ground surface 176 will be assumed to be a substantially planar surface. The line-of-sight 178 of the driver is a line extending substantially parallel to the ground surface 176 from the eye box 116 in the forward direction. As used herein, a direction of the line-of-sight 178 is a direction extending toward and away from the driver and the vehicle 106 along the line-of-sight 178.

The first focal plane 162 is a frontal focal plane which is oriented substantially perpendicularly to the line-of-sight 178 of the driver. The third focal plane 170 is also a frontal focal plane which is oriented substantially perpendicularly to the line-of-sight 178 of the driver. The first and third focal planes 162, 170 are dynamic focal planes which are movable in the direction of the line-of-sight 178, both in the forward direction (away from the vehicle 106) and in a rearward direction (toward the vehicle 106). The second focal plane 166 is a ground-parallel focal plane which is oriented substantially parallel to the ground surface 176, and may be aligned with the ground surface 176 such that the second focal plane 166 is a ground focal plane. The fourth focal plane 174 is also a ground-parallel focal plane which is oriented substantially parallel to the ground surface 176, and is disposed above the ground surface 176. The fourth focal plane 174 may be disposed above the ground surface 176 and the line-of-sight 178 of the driver so as to be located in the sky or ceiling if in an internal building (a sky or ceiling focal plane). The second and fourth focal planes 166, 174 are static focal planes.

It is to be appreciated that though the second and fourth projectors 120, 124 are described herein as being fixedly arranged in the HUD device 102, the second and fourth projectors 120, 124 may also be mounted on actuators capable of moving the second and fourth projectors 120, 124. The actuators may be used to move the second and fourth projectors 120, 124 for the purpose of dynamically adjusting a height of the second and fourth focal planes 166, 174. When mounted in the vehicle 106, dynamically adjusting the height of the second and fourth focal planes 166, 174 may not be necessary since the height of the HUD device 102 and the driver may be fixed with respect to the ground. However, even when mounted in the vehicle 106, actuators may be used to move the second and fourth projectors 166, 174 to adjust an initial height of the second and fourth focal planes 166, 174. Additionally, actuators may be used to move the second and fourth projectors 166, 174 to adjust the height of the second and fourth focal planes 166, 174 based on a detected vertical movement of the driver's seat.

Referring to FIG. 4, the first, second, third, and fourth graphic elements 160, 164, 168, 172 may be used to present different information to the driver. The exact type of information displayed by the first, second, third, and fourth graphic elements 160, 164, 168, 172 may vary. For exemplary purposes, the first graphic element 160 and third graphic element 168 may present a warning to the driver instructing the driver to yield to a hazard or obstacle, or may present a driving instruction associated with rules of the road (e.g., a STOP sign, a YIELD sign, etc.). The second graphic element 164 and fourth graphic element 172 may present navigation instructions to the driver as a graphic overlay presented on the ground surface 176, or may present a vehicle-surrounding indicator to the driver. It is to be appreciated that the first, second, third, and fourth graphic elements 160, 164, 168, 172 may present information or graphic elements to the driver which are different than those described herein, and that only a subset of the first, second, third, and fourth graphic elements 160, 164, 168, 172 may be presented at any given time.

Returning to FIG. 1, the controller 104 may be one or more computers, (arithmetic) processors, or any other devices capable of communicating with at least one vehicle control system 180 and controlling the HUD device 102. The at least one vehicle control system 180 (hereinafter, "vehicle control system 180") may take the form(s) of any vehicle control system 180 used to actively or passively facilitate control of the vehicle 106. The vehicle control system 180 may include or communicate with one or more sensors (not shown) which detect driving and environmental conditions related to the operation of the vehicle 106.

With general reference to the operation of the HUD system 100, the controller 104 communicates with the vehicle control system 180, and based on the communication with the vehicle control system 180, determines the type and position of graphic elements to be presented to the driver of the vehicle

106. Specifically, the controller 104 determines the type of graphic element to be presented as the first, second, third, and fourth graphic elements 160, 164, 168, 172 by the first, second, third, and fourth projectors 118, 120, 122, 124, and controls the first, second, third, and fourth projectors 118, 120, 122, 124 to project the first, second, third, and fourth graphic elements 160, 164, 168, 172 as the determined graphic elements. The controller 104 also determines a target first graphic element position and a target third graphic element position as target positions at which the first and third graphic elements 160, 168 should be rendered in the environment to the driver. The controller 104 then controls the first and second actuators 156, 158 to linearly move the first and third projectors 118, 122 such that the first and third focal planes 162, 170 are moved to the target first and third graphic element positions, respectively.

Accordingly, the first projector 118 projects the first graphic element 160 on the first focal plane 162, which is oriented substantially perpendicularly to the line-of-sight of the driver, and is movable toward and away from the vehicle 106 in the direction of the line-of-sight 178 of the driver through linear movement of the first projector 118 by the first actuator 156. The second projector 120 projects the second graphic element 164 on the second focal plane 166, which is static and oriented parallel to the ground surface 176 and is disposed on the ground surface 176. The third projector 122 projects the third graphic element 168 on the third focal plane 170, which is oriented substantially perpendicularly to the line-of-sight of the driver, and is movable toward and away from the vehicle 106 in the direction of the line-of-sight 178 of the driver through linear movement of the third projector 122 by the second actuator 158. The fourth projector 124 projects the fourth graphic element 172 on the fourth focal plane 174, which is static, oriented parallel to the ground surface 176, and is disposed above the line-of-sight 178 of the driver. The controller 104 controls the first and second actuators 156, 158 to move the first and third projectors 118, 122 so as to move the first and third focal planes 162, 170.

By having the first and third projectors 118, 122 project the first and third graphic elements 160, 168 on the movable first and third focal planes 162, 170 which are oriented substantially perpendicular to the line-of-sight 178 of the driver, focus of objects at different distances from the vehicle 106 may be adjusted. This may facilitate the provision of correct depth cues to the driver for the first and third graphic elements 160, 168, especially since the HUD system 100 is a vehicular application, with the vehicle 106 serving as a moving platform.

While the second and fourth projectors 120, 124 project the second and fourth graphic elements 164, 172 on the static second and fourth focal planes 166, 174, the second and fourth focal planes 166, 174 are continuous. To make the second and fourth focal planes 166, 174 parallel to the ground surface 176, the diffuser screens 150, 154 of the second and fourth projectors 120, 124 may be tilted. Since the optical system of the HUD device 102 has very low distortion and is nearly telecentric for images in a ground-parallel focal plane, light rays are close to parallel with the optical axis, which allows the projected second and fourth graphic elements 164, 172 to be shown without distorting or changing the magnification while the second and fourth focal planes 166, 174 are tilted. The resulting second and fourth graphic elements 164, 172 therefore appear on a continuous focal plane (the second and fourth focal planes 166, 174) parallel to the ground surface 176. In this regard, the second and fourth graphic elements 164, 172 may be rendered with actual 3-dimensional volumetric shape, instead of as line segments, to add monocular cues to strengthen depth perception.

The continuous, static second and fourth focal planes 166, 174 facilitate driver depth perception with regard to the second and fourth graphic elements 164, 172. More particularly, the continuous, static second and fourth focal planes 166, 174 allow for correct generation of real images through the forward-rearward direction in 3-dimensional space (i.e., the direction of the line-of-sight 178 of the driver), allowing proper motion parallax cues to be generated. Accordingly, as the driver's head shifts from side-to-side or up-and-down, the second and fourth graphic elements 164, 172 appear to the driver to be fixed in position in the environment, rather than moving around. Consequently, the HUD system 100 does not need a head-tracking function to compensate for movement of the driver's head.

With regard to the previously-listed exemplary information which may be presented to the driver, the vehicle control system 180 may include processing and sensors capable of performing the following functions: hazard or obstacle detection; navigation; driving instruction; and vehicle surrounding (blind-spot) monitoring. It is to be appreciated that the vehicle control system 180 may also include processing and sensors capable of performing other vehicle control functions (e.g., highway merge assist, etc.), which may alternatively or additionally be tied to information presented to the driver using the HUD system 100. Regardless of the functions performed by the vehicle control system 180, it is to be appreciated that the precise manner of operation of the vehicle control system 180 to perform the functions, including the associated sensors and processing, may not be relevant to the operation of the HUD system 100. Accordingly, a description of the operation of the vehicle control system 180 is not made herein, expect for where it is relevant to the operation of the HUD system 100.

The controller 104 communicates with the vehicle control system 180, and receives therefrom inputs related to the operation of the vehicle 106 and associated with the above-listed (or other) functions. The controller 104 then controls the HUD device 102 based on the inputs received from the vehicle control system 180. In this regard, one or both of the controller 104 and the vehicle control system 180 may determine: the type of graphic element to be displayed as the first, second, third, and fourth graphic elements 160, 164, 168, 172; the location of the first, second, third, and fourth graphic elements 160, 164, 168, 172; and which of the first, second, third, and fourth graphic elements 160, 164, 168, 172 are to be displayed. The determinations may also be based on the vehicle functions employed by the driver, such as whether the driver is using the navigation function.

Regardless of which of the controller 104 and the vehicle control system 180 are used to make these determinations, the controller 104 controls the HUD device 102 to display the appropriate graphic elements in the appropriate locations. This includes controlling the first, second, third, and fourth projectors 118, 120, 122, 124 to project the appropriate first, second, third, and fourth graphic elements 160, 164, 168, 172. This also includes controlling the first and second actuators 156, 158 to linearly move the first and third projectors 118, 122, so as to move the first and third focal planes 162, 170 to the appropriate (target) positions.

In view of the previously-listed exemplary information associated with the first, second, third, and fourth graphic elements 160, 164, 168, 172, operation of the HUD system 100 will be described with reference to the vehicle 106 having the vehicle control system 180 which enables the following functions: a hazard or obstacle detection and warning function; a navigation function; a driving instruction function; and a vehicle surrounding (blind-spot) monitoring function. It is reiterated that the vehicle 106 may have a subset of these functions and/or additional functions, and that the HUD system 100 may be employed with reference to the subset or additional functions. The description of the HUD system 100 with reference to these functions is only exemplary, and these functions are only used to facilitate description of the HUD system 100. Though one or both of the controller 104 and the vehicle control system 180 may make the determinations associated with the operation of the HUD system 100, in the below description the controller 104 is described as being configured to make all of the determinations based on input received from the vehicle control system 180.

Information related to the obstacle detection and warning function may be presented to the driver as a contact-analog augmented reality graphic element projected by the first projector 118 of the HUD device 102. In this regard, the vehicle control system 180 may detect various obstacles in the roadway on which the vehicle 106 is travelling. The obstacles may include pedestrians crossing the roadway, other vehicles, animals, debris in the roadway, potholes, etc. The detection of these obstacles may be made by processing information from the environment sensed by sensors (not shown) provided on the vehicle 106. The obstacle detection may be carried out in any manner.

When an obstacle is detected, the vehicle control system 180 communicates obstacle information to the controller 104. The controller 104 receives the obstacle information from the vehicle control system 180 and determines the type of graphic element to present as the first graphic element 160 and the target first graphic element position based on the received obstacle information. While various types of graphic elements may be used, for exemplary purposes this description will assume that a "YIELD" sign is to be presented when an obstacle is detected.

To facilitate the driver's recognition of the position of the detected obstacle, the YIELD sign may be presented so as to appear on the detected obstacle. In this regard, the target first graphic element position may be determined as a position at which the first graphic element 160 should be rendered in view of the driver based on the position of the detected obstacle relative to the vehicle 106. The controller 104 then controls the first projector 118 to project the appropriate graphic element as the first graphic element 160, and controls the first actuator 156 to linearly move the first projector 118 such that the first graphic element 160 is projected on the first focal plane 162, which is positioned at the target first graphic element position. The controller 104 may also control the first actuator 156 to continuously linearly move the first projector 118 such that the first focal plane 162 moves as a distance between the vehicle 106 and the detected obstacle (i.e., the target first graphic element position) changes (detected by the vehicle control system 180 and communicated to the controller 104), for example, as a result of the vehicle 106 driving toward the detected obstacle and/or the detected obstacle moving relative to the vehicle 106.

Referring to FIG. 4, the obstacle detected by the vehicle control system 180 may be a pedestrian 182 crossing the road on which the vehicle 106 is travelling. Specifically, in the exemplary view of the driver shown in FIG. 4, the vehicle 106 is traveling on a road which is being crossed by the pedestrian 182. Accordingly, the vehicle control system 180 sends obstacle information related to the pedestrian 182 to the controller 104. Based on the obstacle information, the controller 104 determines the type of graphic element to be displayed as the first graphic element 160; in this case, a "YIELD" sign.

The controller 104 then determines the target first graphic element position such that the first graphic element 160 will be projected and rendered so as to be perceived by the driver to be at a same depth as the pedestrian 182.

The controller 104 then controls the first projector 118 to project the "YIELD" sign as the first graphic element 160, and controls the first actuator 156 to linearly move the first projector 118 such that the first graphic element 160 is projected and rendered so as to be perceived by the driver (while the driver's eyes are in the eye box 116 and the driver is looking in the forward direction through the windshield 112) to be at the same depth as the pedestrian 182. Particularly, the first actuator 156 is controlled such that the first graphic element 160 is projected on the first focal plane 162, which is positioned at the target first graphic element position and is oriented substantially perpendicular to the line-of-sight 178.

As the vehicle 106 and the pedestrian 182 travel on the road, the relative distance between the two will change. This change in distance may be communicated to the controller 104 by the vehicle control system 180, the target first graphic element position may be changed accordingly, and the first actuator 156 may be controlled by the controller 104 to move the first focal plane 162 to remain at the (changed/changing) target first graphic element position. Accordingly, projecting the first graphic element 160 on the first focal plane 162 which is movable in the direction of the line-of-sight 178 of the driver, the depth cues associated with the first graphic element 160 are correctly reproduced so that the driver may accurately judge the position of the first graphic element 160, i.e., the detected obstacle.

Information related to the navigation function may be presented to the driver as a contact-analog augmented reality graphic element projected by the second projector 120 of the HUD device 102. In this regard, the vehicle control system 180 may, upon receiving a navigation request from the driver (e.g., the input of a desired location), generate a navigation route for the driver to follow to get to the desired location. The navigation route includes a set of driving directions for the driver to follow, including instructions to turn onto particular streets on the route to the desired location. The navigation function may be carried out in any manner. When the navigation function is activated, the vehicle control system 180 communicates the driving directions associated with the navigation function to the controller 104.

The controller 104 receives the driving directions from the vehicle control system 180 and determines the type of graphic element to present as the second graphic element 164. The types of graphic elements associated with the navigation function may include graphic elements which instruct the driver to continue on the current road (e.g., a straight line or arrow), to turn left or right onto an upcoming cross-road (e.g., a left/right arrow or line turning in the appropriate direction), to enter, merge onto, or exit from a highway (e.g., a line or arrow indicating the appropriate path), etc. The controller 104 selects the appropriate graphic element to present as the second graphic element 164 based on the driving direction communicated from the vehicle control system 180.

Referring to the exemplary view of the driver shown in FIG. 4, the driving direction for the driving route determined by the navigation function of the vehicle control system 180 includes a left-hand turn onto an upcoming street. Accordingly, the controller 104 controls the second projector 120 to generate and project a left-hand turn graphic element as the second graphic element 164 on the second focal plane 166. As shown in FIG. 4, the second focal plane 166 is oriented parallel to the ground surface 176 and is disposed on the ground surface 176. As noted above, the second projector 120 is fixedly arranged in the HUD device 102, such that the second focal plane 166 is static. As also noted above, the second focal plane 166 is continuous, such that the second graphic element 164 is rendered to the driver with appropriate depth cues and as a 3-dimensional image.

Information related to the driving instruction function may be presented to the driver as a contact-analog augmented reality graphic element projected by the third projector 122 of the HUD device 102. In this regard, the vehicle control system 180 may use sensors and/or information stored in a database and associated with a map to monitor the road on which the vehicle 106 is traveling, and to determine upcoming driving instructions associated with travel on that road. For example, the vehicle control system 180 may detect an upcoming required stop, yield, or other condition (hereinafter, collectively referenced as "road condition") on the road on which the vehicle 106 is traveling. The vehicle control system 180 may then also determine a driving instruction associated with the detected road condition (e.g., a stop instruction associated with a stop road condition, etc.). The driving instruction function may be carried out in any manner, the specifics of which are not relevant to the operation of the HUD system 100.

The vehicle control system 180 communicates the road condition and/or the driving instructions associated with the road condition, as well as information related to a position of the road condition, to the controller 104. The controller 104 then controls the third projector 122 to project the third graphic element 168 to communicate information to the driver related to the road condition and/or associated driving instruction. The controller 104 receives the road condition and/or driving instruction information, as well as the position information, from the vehicle control system 180, and determines the type of graphic element to present as the third graphic element 168 and a target third graphic element position.

Various types of graphic elements may be used in conjunction with the driving instruction functions, for example: a STOP sign, a YIELD sign, a ONE WAY sign, a NO TURN ON RED sign, etc. The type of graphic element may be selected to communicate the driving instruction associated with the road condition. Whichever type of graphic element the controller 104 determines should be used as the third graphic element 168, that graphic element may be projected so as to appear at the location of the driving condition. In this regard, the target third graphic element position may be determined as a position at which the third graphic element 168 should be rendered in view of the driver based on the position of the detected road condition relative to the vehicle 106.

The controller 104 then controls the third projector 122 to project the appropriate graphic element as the third graphic element 168. The controller also controls the second actuator 158 to linearly move the third projector 122 such that the third graphic element 168 is projected and rendered so as to be perceived by the driver (while the driver's eyes are in the eye box 116 and the driver is looking in the forward direction through the windshield 112) to be at the same depth as the road condition. Particularly, the second actuator 158 is controlled such that the third graphic element 168 is projected on the third focal plane 170, which is positioned at the target third graphic element position and is oriented substantially perpendicularly to the line-of-sight 178. The controller 104 may also control the second actuator 158 to continuously linearly move the third projector 122 such that the third focal plane 170 moves as a distance between the vehicle 106 and the detected road condition (i.e., the target third graphic element position) changes (as detected by the vehicle control system 180 and communicated to the controller 104), for example, as a result of the vehicle 106 driving toward the detected road condition.

In the exemplary view of the driver shown in FIG. 4, the vehicle 106 is approaching a four-way intersection at which the vehicle 106 should stop. Accordingly, the vehicle control system 180 detects the stop road condition at a position of an entrance of the intersection, and determines the driving instruction associated with the stop road condition to be a stop instruction. The stop road condition and/or instruction, as well as the position of the stop road condition, is communicated to the controller 104, which determines that a STOP sign should be presented as the third graphic element 168. The controller 104 also determines that the third graphic element 168 (i.e., the STOP sign) should appear at the position of the entrance of the four-way intersection. The position of the entrance of the intersection is therefore determined to be the target third graphic element position.

The controller 104 then controls the third projector 122 to project the "STOP" sign as the third graphic element 168, and controls the second actuator 158 to move the third projector 122 such that the third graphic element 168 is projected and rendered so as to be perceived by the driver (while the driver's eyes are in the eye box 116 and the driver is looking in the forward direction through the windshield 112) to be at the same depth as the entrance of the four-way intersection. Particularly, the second actuator 158 is controlled such that the third graphic element 168 is projected on the third focal plane 170, which is positioned at the target third graphic element position and is oriented substantially perpendicularly to the line-of-sight 178. As the vehicle 106 travels on road, the relative distance between the vehicle 106 and the entrance of the four-way intersection will change. This change in distance may be communicated to the controller 104 by the vehicle control system 180, the target third graphic element position may be changed accordingly, and the second actuator 158 may be controlled by the controller 104 to move the third focal plane 170 to remain at the (changed/changing) target third graphic element position. Accordingly, projecting the third graphic element 168 on the third focal plane 170 which is movable in the direction of the line-of-sight 178 of the driver, the depth cues associated with the third graphic element 168 are correctly reproduced so that the driver may accurately judge the position of the third graphic element 168, i.e., the detected road condition.

Information related to the vehicle surrounding (blind-spot) monitoring function may be presented to the driver by the fourth projector 124 of the HUD device 102. In this regard, the vehicle control system 180 may detect the existence of other vehicles in an area immediately surrounding the vehicle 106. The detection of the other vehicles immediately surrounding the vehicle 106 may be made by processing information regarding the surroundings of the vehicle 106 sensed by sensors (not shown) provided on the vehicle 106. The vehicle surrounding determination may be carried out in any manner.

The vehicle surrounding information is determined by the vehicle control system 180 and communicated to the controller 104. The controller 104 receives the vehicle surrounding information from the vehicle control system 180 and determines how, if at all, to modify the fourth graphic element 172 projected on the fourth focal plane 174. In this regard, the graphic element used as the fourth graphic element 172 to facilitate the vehicle surrounding (blind-spot) monitoring function may be a vehicle surrounding indicator, shown in FIG. 4.

The vehicle surrounding indicator includes a central marker representing the vehicle 106 and eight surrounding markers representing positions immediately surrounding the vehicle 106. The vehicle control system 180 communicates information about the positions of vehicles in the immediate surroundings of the vehicle 106, and the controller 104 controls the fourth projector 124 to change the fourth graphic element 172 such that the associated one or more of the eight surrounding markers are highlighted. The highlighting of the eight surrounding markers indicates to the driver the position of other vehicles in the immediate surroundings of the vehicle 106.

As shown in FIG. 4, the fourth graphic element 172 is projected on the fourth focal plane 174, which is oriented parallel to the ground surface 176 and is disposed above the ground surface 176 and the line-of-sight 178. As noted above, the fourth projector 124 is fixedly arranged in the HUD device 102, such that the fourth focal plane 174 is static. As also noted above, the fourth focal plane 174 is continuous, such that the fourth graphic element 172 is rendered to the driver with appropriate depth cues and as a 3-dimensional image.

It is to be appreciated that the fourth graphic element 172 may be presented in a form different than the vehicle surrounding indicator shown in FIG. 4. In any event, the fourth graphic element 172 is projected onto the fourth focal plane 174, which is oriented parallel to the ground surface 176 and is disposed above the ground surface 176 and the line-of-sight 178 of the driver. Accordingly, the fourth graphic element 172 is provided on the sky focal plane, which may be appropriate since the information communicated by the fourth graphic element 172 need not interact with the environment.

The above-described HUD system 100 can project graphic elements, some of which as contact-analog augmented reality graphic elements, at continuously changing focal distances as well as in ground-parallel focal planes with continuous changing focus from front-to-back in the direction of the line-of-sight 178 of the driver. Accordingly, depth perception cues may be improved, to facilitate focus and increase the attention the driver pays to the environment while simultaneously (or near-simultaneously) also observing the information presented via the graphic elements in view of the driver. In this regard, through experimentation, the inventors have determined that spatial perception is greatly influenced by focal cues, and that the focal plane adjusting capability, as well as the capability to show graphic elements on continuous, static ground-parallel focal planes, of the herein-described HUD system 100 improves spatial perception. To this point, a greater improvement in spatial perception is observed when adjusting the focal cues as described herein, than is observed when adjusting a size of a graphic element.

The configuration of the HUD device 102, particularly the use of the beam splitters 126, 130, 134 and lenses 128, 132, 136, 138, allows the HUD device 102 to have a relatively compact size. Furthermore, the lenses 128, 132, 136, 138 allow a range of depth to expand from a few meters in front of the vehicle 106 to infinity within the physical space allocated for the optics of the HUD device 102. Further still, the beam splitters 126, 130, 134 are used as optical combiners to merge all of the disparate sets of projected rays from the first, second, third, and fourth projectors 118, 120, 122, 124 through the lenses 128, 132, 136, 138 so as to combine separate images from the first, second, third, and fourth projectors 118, 120, 122, 124 into one unified image projected in view of the driver.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

For example, fewer or more projectors may be used in the HUD system 100 to project fewer or more graphic elements. Furthermore, while the HUD system 100 is described as having two projectors which project graphic elements in frontal focal planes and two projectors which project graphic elements in ground-parallel focal planes, the proportion of frontal and ground-parallel focal planes may be changed. As described above, all projectors in the HUD system 100 (even if fewer or greater than four projectors are provided) may be mounted in the HUD device 102 via an actuator which may dynamically adjust the position of the focal plane (depth or height). It is also reiterated that the above-described vehicle functions associated with the HUD system 100 are exemplary, and may be changed or modified.

Further still, the mechanism by which the frontal focal planes are moved may be modified from that described above. For example, rather than moving the entire projector (e.g., the first and third projectors 118, 122 using the first and second actuators 156, 158), only the diffuser screens (e.g., the diffuser screens 148, 152 of the first and third projectors 118, 122) may be moved relative to the respective projector units (e.g., the projector units 140, 144).

Additionally, while the HUD system 100 has been described with reference to the vehicle 106, which is a four-wheeled automobile for outdoor use, the HUD system 100 may be used in different types of vehicle. For example, the HUD system may be provided in a marine vehicle (a boat), an air vehicle (an airplane or jet), or a vehicle intended for indoor use (e.g., a transportation cart, a vehicle used for material handling, such as a fork lift, etc.).

The HUD system 100 may also be provided as part of a stationary unit to provide a three-dimensional volumetric viewing device in a room (the HUD system 100 does not need to exist on a moving platform). To this point, the configuration shown in FIG. 2 may be considered to be that of a stationary base, rather than of the vehicle 106. In such a configuration, the "driver" referenced above would be a "user", and the "windshield 112" would be a display screen. Furthermore, the controller 104 may communicate with any associated control system, rather than the vehicle control system 180. It is noted that even when the HUD system 100 is provided outside of a vehicle, the position of the user's eyes (i.e., the eye box 116) may still be considered to be constrained relative to the display screen. For example, HUD system 100 may be provided in a stationary base including a seat which may be substantially fixed relative to the display screen (or movable within a predetermined or known range).

The graphic elements are described above as being static images. However, the graphic elements may be animated. Particularly, the graphic elements may be animated in position, size, color, transparency, etc.

According to the above-described and other aspects, the HUD system 100 is configured to provide an immersive three-dimensional experience to the user. This experience is enabled by providing improved accommodation, vergence, and depth cues to the user.

As described above, the improved cues may be provided, at least in part, by way of projecting a plurality of graphic elements 160, 164, 168, 172 onto a plurality of focal planes 162, 166, 170, 174. The improved cues may also be provided by moving at least some of the focal planes 162, 170 in the direction of the line-of-sight 178 of the user. This movement of the focal planes 162, 170 provides depth to the display of the HUD system 100, thereby improving the three-dimensional cues perceived by the driver.

In this regard, it should be appreciated that the graphic elements 160, 164, 168, 172 and their associated focal planes 162, 166, 170, 174 may be rendered so as to be disposed in the environment in the view of the driver. By rendering the graphic elements 160, 164, 168, 172 and their associated focal planes 162, 166, 170, 174 in the environment, rather than on a display screen of the HUD system 100 (e.g., a vehicle windshield), the graphic elements 160, 164, 168, 172 may be perceived by the user as being in the actual environment.

In addition to the above, the HUD system 100 is also configured to improve on other three-dimensional cues perceived by the driver to further increase the immersiveness of the three-dimensional experience. As an example, the controller 104 may be programmed to process inputs received from the vehicle control system 180 (or any other system with which the HUD system 100 may be associated, if not provided within a vehicle), and to determine a graphic element size of any of the graphic elements to be displayed by the HUD system 100.

The user of the HUD system 100 is likely to perceive smaller graphic elements as being further away, while larger graphic elements may be perceived as being closer. Accordingly, by adjusting the size of the graphic elements 160, 164, 168, 172, especially in conjunction with moving a position of the focal planes 162, 170 of certain graphic elements 160, 168, the perception of the graphic elements 160, 164, 168, 172 as being actually disposed in the environment may be improved.

As an additional example, the controller 104 may control the projectors 118, 120, 122, 124 to render the graphic elements 160, 164, 168, 172 in perspective. For example, the graphic elements 160, 164, 168, 172 may be rendered with shading, shaping, and scaling typical of a three-dimensional image drawn on a two-dimensional medium.

In operation, the HUD system 100 will hereinbelow be described as including a projector system, which should be understood to include at least one of the first to fourth projectors 118, 120, 122, 124 described above, as well as any additional projectors that may be added to the HUD system 100 while remaining within the scope of the instant disclosure. For exemplary purposes, the projector system will be described as including the first projector 118, which is mounted on the first actuator 156 and is capable of projecting the first graphic element 160 on the first focal plane 162, which is oriented substantially perpendicularly to the line-of-sight of the user 178, in view of the user while the user view the environment. Additional projectors which project a graphic element on a dynamic frontal focal plane (e.g., the third projector 122) will be referenced as secondary projectors, while projectors that project a graphic element on a ground-parallel focal plane (e.g., the second and fourth projectors 120, 124) will be referenced as tertiary projectors. Moreover, for purposes of the below discussion, the term "projector" is considered to encompass those components associated with the operation of the projectors (e.g., the actuators 156, 158).

With initial reference to the control of the first projector 118, the controller 104 determines a first target graphic element position and controls the first actuator 156 to move the first projector 118 such that the first graphic element 160 is projected on the first focal plane 162 which is disposed at the first target graphic element position. The first target graphic element position, and therefore the first focal plane 162, is disposed in the environment in the view of the user and spaced from the HUD system 100.

The controller 104 is also programmed to determine a first graphic element size, which is a size at which the first graphic element 160 is to be displayed to the user. The first graphic element size is determined to increase as the first target graphic element position approaches the user, and to decrease as the first target graphic element position moves away from the user. Moreover, the controller 104 may continuously determine the first graphic element size, so that the first graphic element size changes as the first target graphic element position changes relative to the user. For example, as the user driving in the vehicle approaches a position at which the first target graphic element position is located, the first focal plane 162 is moved to reflect the user's motion relative to a real world position at which the first graphic element 160 is to be displayed, and the first graphic element size is increased so that the first graphic element 160 grows to reflect its proximity to the user. In this way, the first graphic element size is determined based on the first target graphic element position.

It is to be appreciated that a similar control may be applied to one or more secondary projectors (e.g., the third projector 122), or to one or more tertiary projectors (e.g., the second and fourth projectors 120, 124). Alternatively, tertiary projectors (e.g., the second and fourth projectors 120, 124) may simply operate in the manner described above, without adjusting a graphic element size.

By adjusting a position of the focal planes while also adjusting a size of the graphic elements displayed on the focal planes, the user's perception of a three-dimensional display is improved. Notably, the system provides both depth cues (by moving the focal planes) and other perception cues (by adjusting the size of the graphic elements). Additionally, when several graphic elements are displayed, displaying each of the graphic elements on a unique focal plane may provide additional depth cues to the user. The three-dimensional immersion of the user may be further improved by also rendering the graphic elements in perspective (e.g., as three-dimensional images with shading, etc.)

Figure 5:
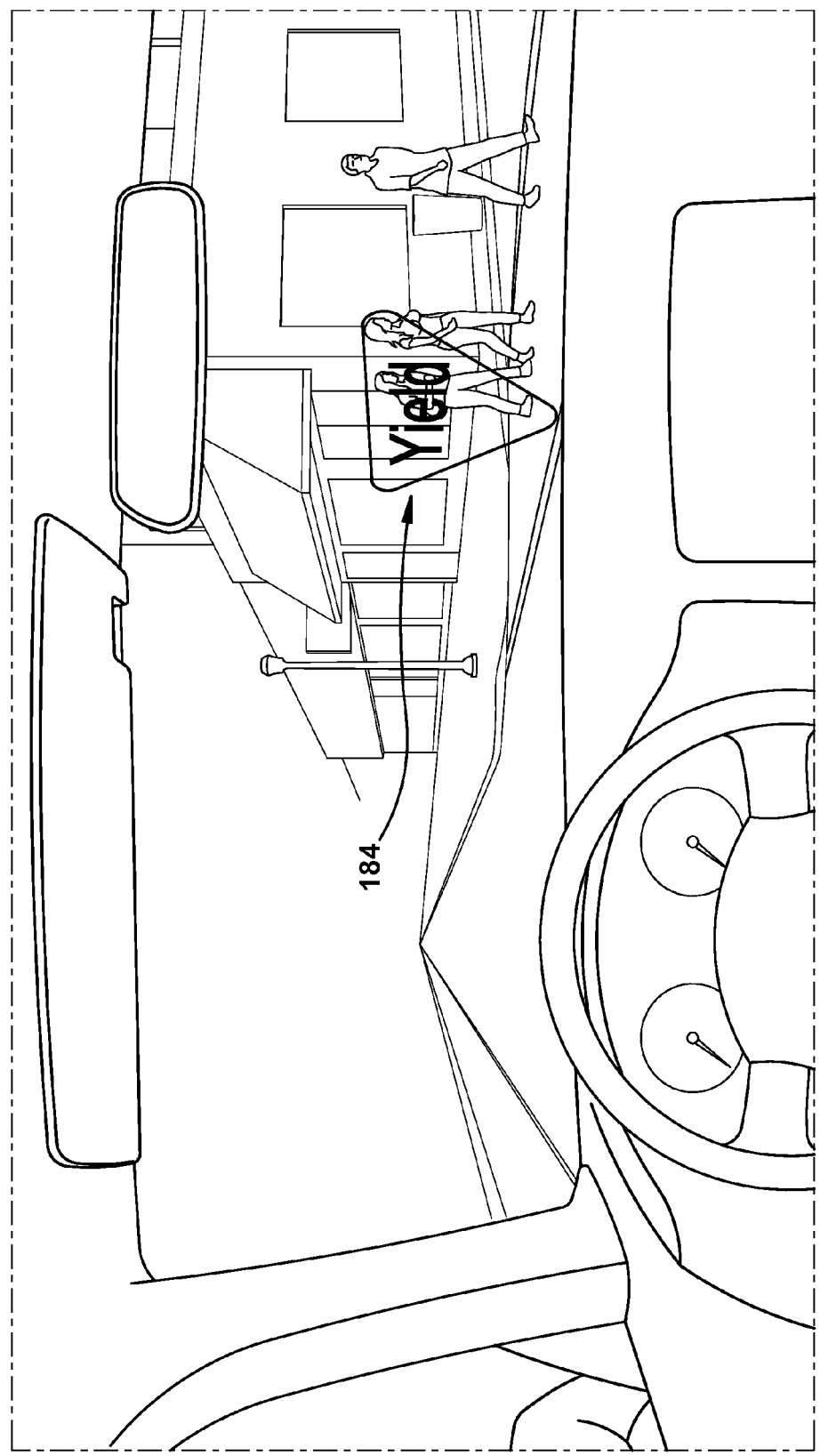
FIG. 5 illustrates an exemplary view of the user as a driver while driving a vehicle and looking through a windshield of the vehicle, and shows an exemplary three-dimensional graphic element projected by the heads-up display system on a focal plane oriented substantially perpendicularly to a line-of-sight of the user.

As an additional alternative, more than one projector may cooperatively project a single combined graphic element to the user. Such a display may be provided to lend increased depth to the combined graphic element, as exemplified in the frontal focal plane graphic element 184 shown in FIG. 5. This frontal focal plane graphic element 184 may have a first half (i.e., a right-side half) projected by the first projector 118 on the first focal plane 162, and a second half (i.e., a left-side half) projected by the third projector 122 on the third focal plane 170. By positioning the first and third focal planes 162, 170 near each other (i.e., by determining the first target graphic element position to be near the third target graphic element position), the first and third graphic elements 160, 168 may appear to be merged into the single frontal plane graphic element 184.

Figure 6:
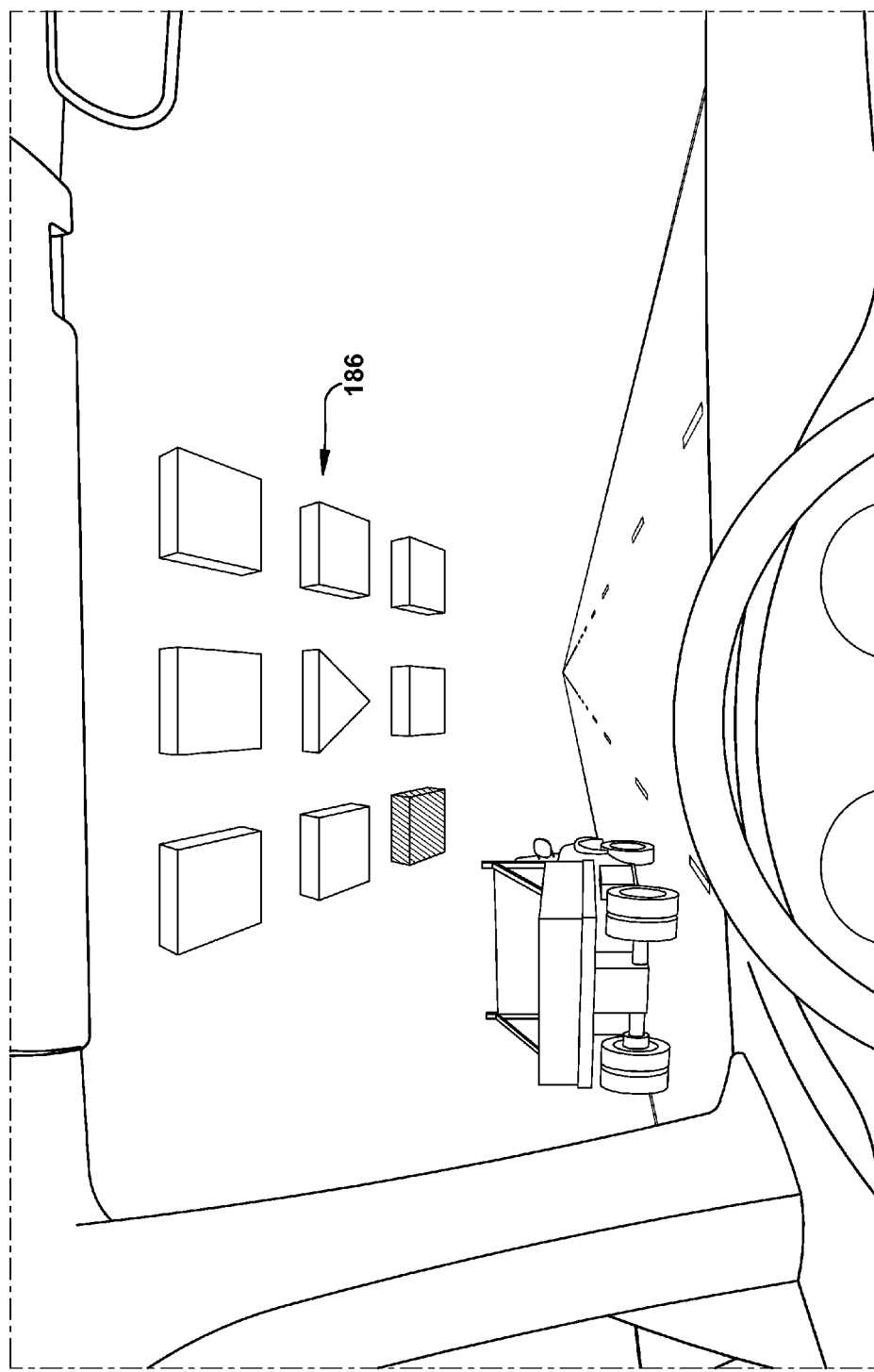
FIG. 6 illustrates an exemplary view of the user as a driver while driving a vehicle and looking through a windshield of the vehicle, and shows an exemplary three-dimensional graphic element projected by the heads-up display system on a focal plane oriented substantially parallel to a ground surface.

Turning to FIG. 6, an exemplary sky plane graphic element 186, which is a single combined graphic element, is shown. A similar graphic element, as shown in FIG. 4 (element 172), may be rendered as a three-dimensional graphic element projected onto only the static fourth focal plane by rendering the graphic element 172 in perspective. As an alternative, the sky plane graphic element 186 may be displayed cooperatively using, for example, the fourth projector 124 and any one or more of the frontal focal plane projectors (e.g., the first and third projectors 118, 122). The cooperation between these projectors would function similarly to that of the cooperation between the first and third projectors 118, 122 described above, where one of the frontal focal planes (e.g., the first and third focal planes 162, 170) would be positioned near enough to the fourth focal plane 174 such that the graphic elements projected by the projectors would merge into the singular sky plane graphic element 186 (i.e., the first and third target graphic element positions would be determined to be near the static fourth focal plane 174).

It is reiterated that while the HUD system 100 has been described with reference to four focal planes, the HUD system 100 may actually be configured to projector graphic elements on a far greater number of unique, dynamic focal planes. As the number of unique, dynamic focal planes increases, the ability of the HUD system 100 to effectively render three-dimensional graphic elements that appear to the user to be actually located in the environment, at a position spaced from the user and the HUD system 100 (including any components of an associated or support apparatus, such as a vehicle windshield 112), is increased.

The invention claimed is:

1. A heads-up display system for displaying a graphic element in view of a user while the user views an environment disposed at a position spaced from the heads-up display system, the heads-up display system comprising:
a projector system comprising a first projector that projects a first graphic element on a dynamic first focal plane in view of the user while the user views the environment, the first focal plane disposed in the environment;
at least one secondary projector that projects a secondary graphic element on a dynamic secondary focal plane in view of the user while the user views the environment, the secondary focal plane disposed in the environment and being different than the first focal plane of the first projector; and
a controller programmed to determine a first target graphic element position at which the first graphic element is to be displayed, the first target graphic element position being disposed in the environment, and to control the first projector to project the first graphic element on the first focal plane disposed at the first target graphic element position, and wherein the controller is programmed to determine a secondary target graphic element position at which the secondary graphic element is to be displayed, the secondary target graphic element position being disposed in the environment, and to control the secondary projector to project the secondary graphic element on the secondary focal plane disposed at the determined secondary target graphic element position.

2. The heads-up display system according to claim 1, wherein the first focal plane is oriented substantially perpendicularly to a line-of-sight of the user.

3. The heads-up display system according to claim 2, wherein the controller is also programmed to determine a first graphic element size based on the first target graphic element position, and to control the first projector to project the first graphic element on the first focal plane disposed at the determined first target graphic element position, and at the determined first graphic element size.

4. The heads-up display system according to claim 3, wherein the controller is programmed to control the first projector to render the first graphic element in perspective.

5. The heads-up display system according to claim 1, wherein the controller is also programmed to determine a first graphic element size based on the first target graphic element position, and to control the first projector to project the first graphic element on the first focal plane disposed at the determined first target graphic element position, and at the determined first graphic element size.

6. The heads-up display system according to claim 5, wherein the controller is programmed to continuously determine the first target graphic element position and the first graphic element size, and to control the first projector to move the first focal plane on which the first graphic element is displayed and to adjust a size of the displayed first graphic element.

7. The heads-up display system according to claim 1, wherein the first focal plane and the secondary focal plane are both oriented substantially perpendicularly to a line-of-sight of the user.

8. The heads-up display system according to claim 7, wherein the controller is programmed to control the first projector and the secondary projector to display a single combined graphic element by determining the first target graphic element position to be near the secondary target graphic element position.

9. The heads-up display system according to claim 1, wherein the controller is also programmed to determine a first graphic element size based on the first target graphic element position, and a secondary graphic element size based on the secondary target graphic element position,
the controller is programmed to control the first projector to project the first graphic element on the first focal plane disposed at the determined first target graphic element position, and at the determined first graphic element size, and
the controller is programmed to control the secondary projector to project the secondary graphic element on the secondary focal plane disposed at the determined secondary target graphic element position, and at the determined secondary graphic element size.

10. The heads-up display system according to claim 9, wherein the projector system comprises a plurality of secondary projectors, and the controller is programmed to independently control each of the secondary projectors.

11. The heads-up display system according to claim 1, wherein, in addition to the first projector and the at least one secondary projector, the projector system further comprises at least one tertiary projector that projects a tertiary graphic element on a static tertiary focal plane disposed in the environment and being different than the first focal plane and the secondary focal plane, the static tertiary focal plane being substantially parallel to a ground surface and disposed at a position that is one of: above a line-of-sight of the user and below the line-of-sight of the user.

12. The heads-up display system according to claim 11, wherein the controller is also programmed to determine a first graphic element size based on the first target graphic element position, and a secondary graphic element size based on the secondary target graphic element position,
the controller is programmed to control the first projector to project the first graphic element on the first focal plane disposed at the determined first target graphic element position, and at the determined first graphic element size, and
the controller is programmed to control the secondary projector to project the secondary graphic element on the secondary focal plane disposed at the determined secondary target graphic element position, and at the determined secondary graphic element size.

13. The heads-up display system according to claim 12, wherein the projector system comprises a plurality of secondary projectors and a plurality of tertiary projectors, and the controller is programmed to independently control each of the secondary projectors and each of the tertiary projectors.

14. The heads-up display system according to claim 11, wherein the controller is programmed to control at least two of the first projector, the secondary projector, and the tertiary projector to display a single combined graphic element by determining at least one of the first target graphic element position and the secondary target graphic element position to be near the static tertiary focal plane.

15. A controller for controlling a heads-up display device that displays graphic elements in view of a user while the user views an environment disposed at a position spaced from and in front of the heads-up display device, the heads-up display device including a projector system adapted to project a plurality of graphic elements on a plurality of focal planes in view of the user while the user views the environment, with each of the plurality of focal planes being disposed in the environment, wherein the controller is programmed to determine a target graphic element position for each graphic element, and to control the heads-up display device to project each of the plurality of graphic elements on an associated one of the plurality of focal planes disposed at the target graphic element position determined for the graphic element, wherein the controller is also programmed to determine a graphic element size for each of the graphic elements based on the target graphic element position determined for each of the graphic elements, and to control the heads-up display device to project each of the plurality of graphic elements on the associated one of the plurality of focal planes disposed at the target graphic element position determined for the graphic element, and at the graphic element size determined for the graphic element.

16. The controller according to claim 15, wherein at least one of the plurality of graphic elements is a perspective rendering.

* * * * *